US010649456B2

(12) United States Patent
Aiuchi et al.

(10) Patent No.: US 10,649,456 B2
(45) Date of Patent: May 12, 2020

(54) SUB-MOBILITY DEVICE CHARGING SYSTEM FOR VEHICLE

(71) Applicant: SUBARU CORPORATION, Tokyo (JP)

(72) Inventors: Yuji Aiuchi, Tokyo (JP); Katsumi Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 176 days.

(21) Appl. No.: 15/949,801

(22) Filed: Apr. 10, 2018

(65) Prior Publication Data
US 2018/0314262 A1 Nov. 1, 2018

(30) Foreign Application Priority Data

Apr. 28, 2017 (JP) ................................ 2017-089153

(51) Int. Cl.
G05D 1/00 (2006.01)
A61G 3/00 (2006.01)
(Continued)

(52) U.S. Cl.
CPC ......... G05D 1/0217 (2013.01); A61G 3/0808 (2013.01); A61G 5/04 (2013.01);
(Continued)

(58) Field of Classification Search
CPC ...... G05D 1/00; G05D 1/0217; G05D 1/0287; G05D 1/0291; A61G 3/00; A61G 3/0808;
(Continued)

(56) References Cited

U.S. PATENT DOCUMENTS 8,942,919 B2 * 1/2015 Uyeki ................ G01C 21/3469
701/22
9,970,778 B2 * 5/2018 Aich ...................... B60L 58/12
(Continued)

FOREIGN PATENT DOCUMENTS

JP 2004-114956 A 4/2004
JP 2006-006702 A 1/2006
(Continued)

OTHER PUBLICATIONS

Japanese Office Action, dated Apr. 2, 2019, in Japanese Application No. 2017-089153 and English Translation thereof.

Primary Examiner — Yonel Beaulieu
(74) Attorney, Agent, or Firm — McGinn I.P. Law Group, PLLC.

(57) ABSTRACT

A sub-mobility device charging system for a vehicle is capable of moving while carrying a sub-mobility device in which a passenger sits. The system includes an acquisition unit, a main electric power supply unit and a controller. The acquisition unit acquires a destination or traveling schedule inputted to the sub-mobility device; the main electric power supply unit supplies electric power to the sub-mobility device carried in the vehicle; and the controller controls to supply electric power to the sub-mobility device via the main electric power supply unit. The controller charges the sub-mobility device on a basis of the acquired traveling schedule for the sub-mobility device in the destination, and generates a traveling route to guide the charged sub-mobility device to a stop-off points corresponding to the destination.

20 Claims, 6 Drawing Sheets

(51) Int. Cl.
    *A61G 5/04*      (2013.01)
    *A61G 5/00*      (2006.01)
    *G01C 21/34*     (2006.01)
    *G05D 1/02*      (2020.01)
    *A61G 3/08*      (2006.01)
    *A61G 5/10*      (2006.01)
    *B60L 53/12*     (2019.01)
    *B60L 58/12*     (2019.01)
    *B60L 58/20*     (2019.01)

(52) U.S. Cl.
    CPC ............. *A61G 5/046* (2013.01); *A61G 5/101* (2013.01); *G05D 1/0291* (2013.01); *A61G 2203/20* (2013.01); *A61G 2203/30* (2013.01); *A61G 2220/14* (2013.01); *B60L 53/12* (2019.02); *B60L 58/12* (2019.02); *B60L 58/20* (2019.02); *B60L 2200/24* (2013.01); *B60L 2240/622* (2013.01); *B60L 2260/54* (2013.01); *G05D 2201/0206* (2013.01)

(58) Field of Classification Search
    CPC . A61G 5/00; A61G 5/04; A61G 5/046; A61G 5/101; B60L 58/00; B60L 58/12; B60L 58/13; G01C 21/34; G01C 21/3407; G01C 21/3423
    See application file for complete search history.

(56) References Cited

U.S. PATENT DOCUMENTS

| | | | |
|---|---|---|---|
| 2010/0094496 A1* | 4/2010 | Hershkovitz | B60L 3/12 701/22 |
| 2012/0109515 A1* | 5/2012 | Uyeki | G01C 21/3469 701/423 |
| 2014/0277899 A1* | 9/2014 | Matsuzaki | G05D 1/0287 701/25 |
| 2016/0097650 A1 | 4/2016 | Aich et al. | |

FOREIGN PATENT DOCUMENTS

| | | |
|---|---|---|
| JP | 2007-139486 A | 6/2007 |
| JP | 2009-078740 A | 4/2009 |
| JP | 2011-083165 A | 4/2011 |
| JP | 2015-001466 A | 1/2015 |
| JP | 2015-001933 A | 1/2015 |
| JP | 2016-025712 A | 2/2016 |
| JP | 2016-038668 A | 3/2016 |

* cited by examiner

SUB-MOBILITY DEVICE CHARGING SYSTEM FOR VEHICLE

CROSS-REFERENCE TO RELATED APPLICATIONS

The present application claims priority from Japanese Patent Application No. 2017-089153 filed on Apr. 28, 2017, the entire contents of which are hereby incorporated by reference.

BACKGROUND

1. Technical Field

The present invention relates to a sub-mobility device charging system for a vehicle capable of moving while carrying sub-mobility devices in which passengers sit.

2. Related Art

Conventionally, wheelchairs have been used by elderly persons and handicapped persons who have difficulty walking by themselves. In recent years, a personal mobility device such as a wheel chair capable of automatically running by an electric motor and so forth is being proposed. To realize a society where this personal mobility device becomes widespread, and therefore people having difficulty walking by themselves are easy to live active lives, it is desired that the personal mobility device is used by not only people having difficulty walking by themselves but also people who can walk by themselves. Therefore, it is important that a personal mobility device can get in a vehicle such as an automobile while a passenger sits in the personal mobility device, as an example of wheelchair disclosed in, for example, Japanese Unexamined Patent Applications No. 2006-006702 and 2004-114956.

SUMMARY OF THE INVENTION

An aspect of the present invention provides a sub-mobility device charging system for a vehicle capable of moving while a carrying sub-mobility device in which a passenger sit. The system includes: an acquisition unit configured to acquire a destination or traveling schedule inputted to the sub-mobility device; a main electric power supply unit configured to supply electric power to the sub-mobility device carried in the vehicle; and a controller configured to control to supply electric power to the sub-mobility device via the main electric power supply unit. The controller charges the sub-mobility device on a basis of the acquired traveling schedule for the sub-mobility device in the destination, and generates a traveling route to guide the charged sub-mobility device to a stop-off point corresponding to the destination.

DETAILED DESCRIPTION

Hereinafter, examples of the present invention will be described with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following examples which are not recited in a most-generic independent claim of the disclosure are optional and may be provided on an as-needed basis. The drawings are schematic and are not intended to be drawn to scale.

When a sub-mobility device which can be carried in a vehicle is used, it is preferred that the sub-mobility device is sufficiently charged in advance. However, even though the sub-mobility device is not sufficiently charged, there may be a case where the sub-mobility device needs to be used to immediately depart for an urgent matter. Therefore, it is desirable to charge the sub-mobility device, for example, in a vehicle while the vehicle moves.

EXAMPLE 1

Figure 1:
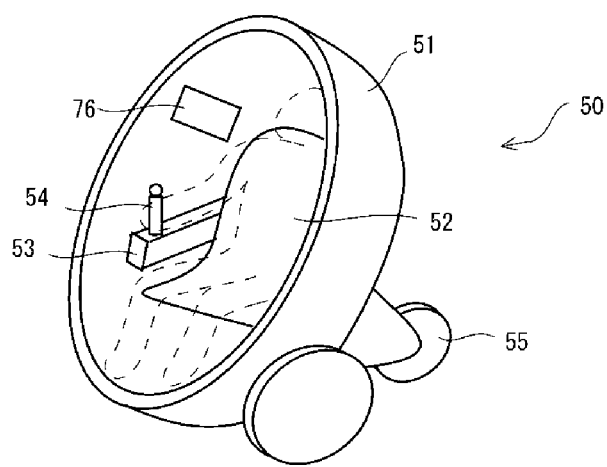
FIG. 1 is a schematic view illustrating an exemplary sub-mobility device applied to the present invention.

FIG. 1 is a schematic view illustrating an exemplary sub-mobility device 50 applied to the present invention. As illustrated in FIG. 1, the sub-mobility device 50 has an egg-shaped body 51. A seat 52 on which a passenger sits is disposed inside the body 51. Armrests 53 are disposed on the right and left sides of the seat 52. A control lever 54 is disposed in the front end of the armrest 53. In addition, a plurality of wheels 55 are provided on the lower part of the body 51.

Figure 2:
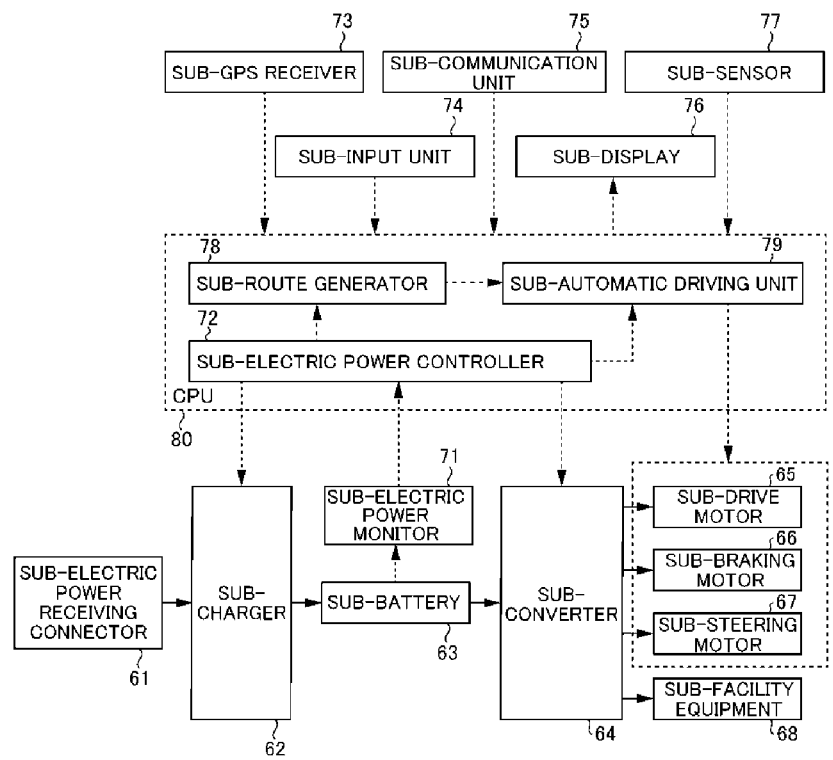
FIG. 2 illustrates an exemplary electric circuit of the sub-mobility device illustrated in FIG. 1.

FIG. 2 illustrates an exemplary electric circuit of the sub-mobility device 50 illustrated in FIG. 1. As illustrated in FIG. 2, the electric circuit of the sub-mobility device 50 includes an electric power system including a sub-electric power receiving connector 61, a sub-charger 62, a sub-battery 63, a sub-convertor 64, a sub-drive motor 65 for driving the plurality of wheels 65, a sub-braking motor 66, a sub-steering motor 67, and a sub-facility equipment 68.

The sub-electric power receiving connector 61 is coupled to, for example, a commercial electric power supply by a power cord. Electric power is supplied from the sub-electric power receiving connector 61 to the sub-charger 62, so that the sub-charger 62 charges the sub-battery 63. The sub-convertor 64 converts the electric power stored in the sub-battery 63, and supplies the converted electric power to loading devices such as the sub-drive motor 65, the sub-braking motor 66, the sub-steering motor 67, and the sub-facility equipment 68. The sub-drive motor 65 is driven to rotate the plurality of wheels 55, so that the sub-mobility device 50 can move forward or backward. The sub-steering motor 67 is driven to turn the wheels 55, so that the sub-mobility device 50 can turn to the right or the left. The sub-braking motor 66 is driven to stop the rotation of the plurality of wheels 55, so that the sub-mobility device 50 can be stopped. In this way, the sub-mobility device 50 can run carrying a passenger on the seat 52, by using the electric power stored in the sub-battery 63 charged by the sub-charger 62 supplied with the electric power from the sub-electric power receiving connector 61.

Moreover, as illustrated in FIG. 2, the electric circuit of the sub-mobility device 50 includes a control system including a sub-electric power monitor 71, a sub-electric power controller 72, a sub-GPS (global positioning system) receiver 73, a sub-input unit 74, a sub-communication unit 75, a sub-display 76, a sub-sensor 77, a sub-route generator 78, and a sub-automatic driving unit 79. The sub-electric power controller 72, the sub-route generator 78, and the sub-automatic driving unit 79 may be implemented when a CPU (central processing unit) 80 executes a program. This control system may receive the electric power from the sub-converter 64, as part of the above-described sub-facility equipment 68.

The sub-electric power monitor 71 monitors conditions of the sub-battery 63. The conditions of the sub-battery 63 include, for example, a charging voltage and a temperature. The sub-electric power controller 72 controls the sub-charger 62 and the sub-convertor 64, based on information from the sub-electric power monitor 71. For example, when the power cord is coupled to the sub-electric power receiving connector 61, and therefore the sub-charger 62 can charge the sub-battery 63, the sub-electric power controller 72 controls the charging of the sub-charger 62 until the voltage of the sub-battery 63 becomes a predetermined maximum voltage. When the voltage of the sub-battery 63 is lower than a predetermined minimum voltage, the sub-electric power controller 72 causes the sub-convertor 64 to stop the electric power conversion. In addition, when the voltage of the sub-battery 63 is equal to or lower than a voltage a little higher than the predetermined minimum voltage, the sub-electric power controller 72 causes the sub-converter 64 to reduce the electric power to be supplied to each of the loading devices. The sub-electric power controller 72 appropriately or periodically informs the sub-route generator 78 and the sub-automatic driving unit 79 of these power control states and the condition of the sub-battery 63.

The sub-GPS receiver 73 receives a radio wave from a GPS satellite. By receiving radio waves from a plurality of GPS satellites, it is possible to calculate the location of the sub-mobility device 50. The sub-input unit 74 is a device configured to receive the input operation of the passenger, and includes, for example, the above-described control lever 54. The sub-communication unit 75 communicates with a different device, such as a main communication unit 35 of an automobile 1 to transmit and receive data. In addition, the sub-communication unit 75 communicates with a base station, and therefore can acquire information on the location of the base station. The sub-display 76 is, for example, a liquid crystal device with touch panel. This touch panel may function as part of the sub-input unit 74. The sub-sensor 77 is configured to detect the location, the speed, and the surrounding environment of the sub-mobility device 50. The sub-route generator 78 receives, for example, a destination, and therefore generates a traveling route from the present location to the destination of the sub-mobility device 50. The sub-automatic driving unit 79 outputs control signals to the sub-drive motor 65, the sub-braking motor 66 and sub-steering motor 67, according to, for example, the generated traveling route. By this means, the sub-mobility device 50 can automatically move to the destination along the traveling route.

Here, to realize a society where the sub-mobility device 50 becomes widespread, and therefore people having difficulty walking by themselves are easy to live active lives, it is desired that the sub-mobility device 50 is used by not only people having difficulty walking by themselves but also people who can walk by themselves. Therefore, it is important that the sub-mobility device 50 can get in a vehicle such as the automobile 1 while a passenger sits in the sub-mobility device 50. In addition, when the sub-mobility device 50 is carried in the automobile 1, it is preferred that the sub-mobility device 50 can be charged in the automobile 1. By this means, even when a passenger gets in the sub-mobility device 50 insufficiently charged and starts to travel, it is possible to charge the sub-mobility device 50 in the automobile 1. Then, after getting out of the automobile 1, the passenger sitting in the sub-mobility device 50 sufficiently charged can move to a destination, and move around in the destination. With this additional value, a next-generation transportation system with organically combined sub-mobility and vehicle becomes more convenient, and therefore increased use of the sub-mobility device 50 is expected.

However, the main battery 14 and the electric generator which can be mounted in the automobile 1 naturally have limited electric storage capacity and electric generation capacity, respectively. In particular, when the automobile 1 is an electric automobile, the battery 14 mounted in the automobile 1 tends to be limited in the capacity required to run the automobile 1, because the performance of the electric automobile is restricted by the gain of weight due to the battery. As a result, the electric power supply from the automobile 1 to the sub-mobility device 50 may be limited. If the electric power is supplied from the automobile 1 to the sub-mobility device 50, the amount of electric power remaining in the automobile 1 becomes insufficient, so that the automobile 1 cannot move to the destination. This situation should be avoided. Meanwhile, not so much as the automobile 1, the sub-mobility device 50 needs a relatively large amount of electric power when the sub-mobility device 50 moves while carrying a passenger. When electric power is supplied from the automobile 1 to the sub-mobility device 50, the amount of reduction in the electric power of the automobile 1 is significantly different from when, for example, an electric device such as a mobile phone is charged in the automobile 1. As a result, the charging of the sub-mobility device 50 in the automobile 1 may affect the running capability of the automobile 1.

Therefore, for the next-generation transportation system where the sub-mobility device 50 is carried in the automobile 1, it is desirable to adequately control to supply electric power from the automobile 1 to the sub-mobility device 50.

Figure 3:
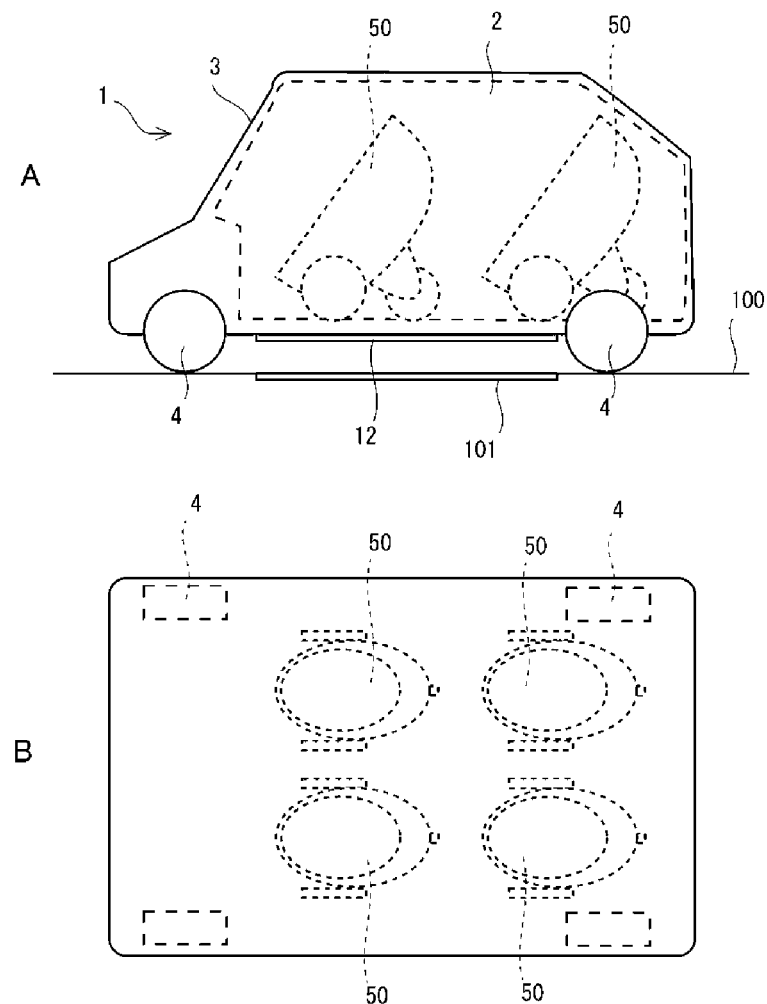
FIG. 3 is a schematic view illustrating an automobile according to an example of the present invention.

FIG. 3 is a schematic view illustrating the automobile 1 according to an example of the present invention. FIG. 3A is a side view, and FIG. 3B is a plan view. The automobile 1 illustrated in FIG. 3 includes a vehicle body 3 having a vehicle compartment 2, and wheels 4 provided on the lower part of the vehicle body 3. Four sub-mobility devices 50, each two of which are arranged in one line, are carried in the vehicle compartment 2. In addition, FIG. 3 illustrates a main electric power receiving coil 12 provided on a floor surface of the vehicle body 3, and an electric power transmission coil 101 provided on a driving lane 100 of a road surface on which the automobile 1 can run. The electric power transmission coil 101 can supply electric power to the automobile 1 running on the driving lane 100 of the road surface without contact with the automobile 1. The main electric power receiving coil 12 receives electric power supplied from the electric power transmission coil 101 located outside the automobile 1.

Figure 4:
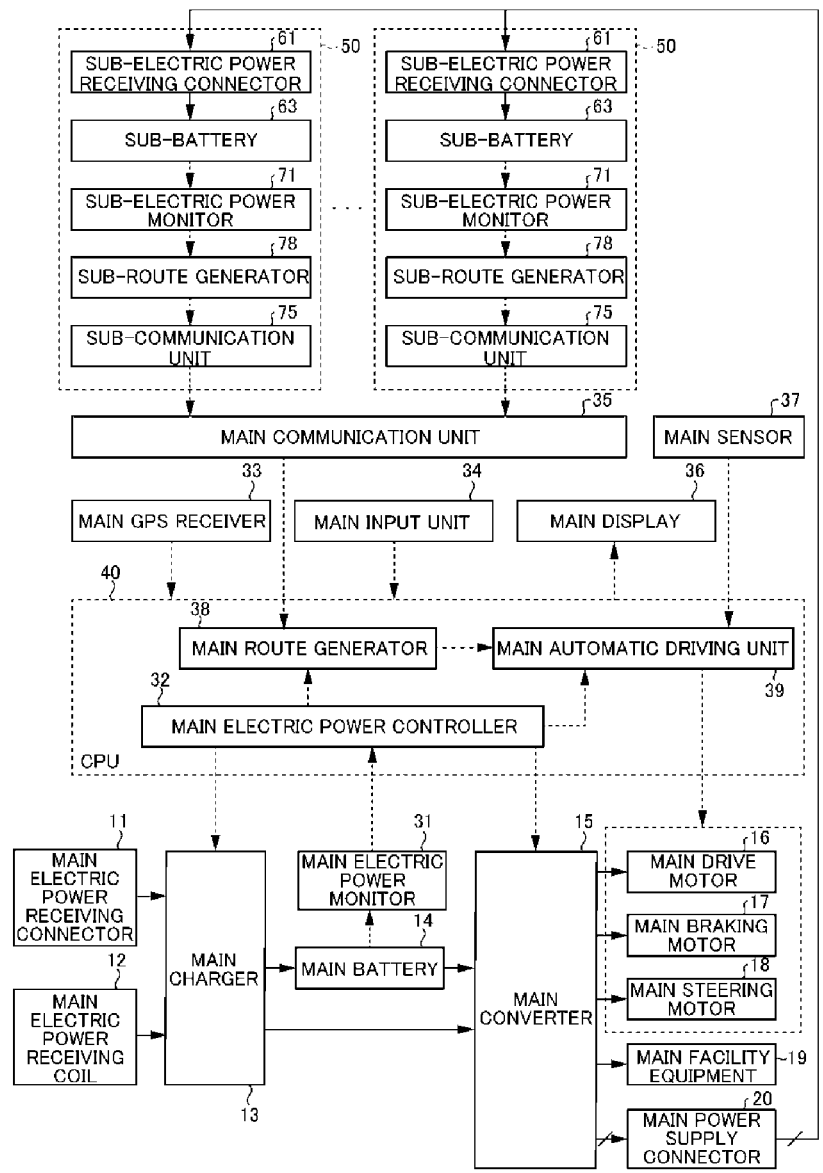
FIG. 4 illustrates an exemplary sub-mobility device charging system for the automobile illustrated in FIG. 3.

FIG. 4 illustrates an exemplary sub-mobility device charging system for the automobile 1 illustrated in FIG. 3. The automobile 1 is an example of vehicle. As illustrated in FIG. 4, the electric circuit of the automobile 1 illustrated in FIG. 3 includes an electric power system including a main electric power receiving connector 11, the main electric power receiving coil 12, a main charger 13, the main battery 14, a main converter 15, a main drive motor 16 for driving the plurality of wheels 4, a main braking motor 17, a main steering motor 18, a main facility equipment 19, and a main electric power supply connector 20.

The main electric power receiving connector 11 is used when the automobile 1 is parked, and coupled to, for example, a commercial electric power supply by a power cord. Electric power is supplied from the main electric power receiving coil 12 or the main electric power receiving connector 11 to the main charger 13, so that the main charger 13 charges the main battery 14. The main converter 15 converts the electric power stored in the main battery 14, and supplies the converted electric power to loading devices such as the main drive motor 16, the main braking motor 17, the main steering motor 18, the main facility equipment 19 and the main electric power supply connector 20. The main converter 15 supplies the electric power supplied to the main electric power receiving connector 11 and the main electric power receiving coil 12, or the electric power stored in the main battery 14, to the main electric power supply connector 20. The main electric power supply connector 20 is coupled to the sub-electric power receiving connector 61 of the sub-mobility device 50 carried in the automobile 1 by, for example, a power cord. The main electric power supply connector 20 is used to supply the electric power from the automobile 1 to the sub-mobility devices 50 carried in the automobile 1. The main drive motor 16 is driven to rotate the plurality of wheels 4, so that the automobile 1 can move forward or backward. The main steering motor 18 is driven to turn the wheels 4, so that the automobile 1 can turn to the right or the left. The main-braking motor 17 is driven to stop the rotation of the plurality of wheels 4, so that the automobile 1 can be stopped. In this way, the automobile 1 can run carrying the sub-mobility devices 50, by using the electric power stored in the main battery 14 charged by the main charger 13 supplied with the electric power from the main electric power receiving coil 12 or the main electric power receiving connector 11.

In addition, as illustrated in FIG. 4, the electric circuit of the automobile 1 includes a control system including a main electric power monitor 31, a main electric power controller 32, a main GPS receiver 33, a main input unit 34, a main communication unit 35, a main display 36, a main sensor 37, a main route generator 38, and a main automatic driving unit 39. The main electric power controller 32, the main route generator 38, and the main automatic driving unit 39 may be implemented when a CPU 40 as a controller executes a program. The CPU 40 may be provided in the automobile 1 as an ECU. As part of the above-described main facility equipment 19, each of these components of the control system may be supplied with electric power from the main converter 15.

The main electric power monitor 31 monitors conditions of the main battery 14. The conditions of the main battery 14 include, for example, a charging voltage and a temperature. The main electric power controller 32 controls the main charger 13 and the main convertor 15, based on information from the main electric power monitor 31. The main electric power controller 32 controls to supply electric power from the main converter 15 to the sub-mobility devices 50 via the main electric power supply connector 20. For example, when the power cord is coupled to the main electric power receiving connector 11, and therefore the main charger 13 can charge the main battery 14, the main electric power controller 32 controls the charging of the main charger 13 until the voltage of the main battery 14 becomes a predetermined maximum voltage.

The main GPS receiver 33 receives a radio wave from GPS satellite. By receiving radio waves from a plurality of GPS satellites, it is possible to calculate the location of the automobile 1. Here, the main GPS receiver 33 may receive, for example, other radio waves, and acquire a corrected location of the automobile 1 based on the radio waves. The main input unit 34 is a device configured to receive the input operation of the passenger. The main communication unit 35 communicates with other devices, for example, the sub-communication unit 75 of the sub-mobility device 50 to transmit and receive data. In addition, the main communication unit 35 communicates with the base station, and therefore can acquire information on the location of the base station. The main display 36 is, for example, a liquid crystal device with touch panel. This touch panel may function as part of the main input unit 34. The liquid crystal device with touch panel is disposed on, for example, the front surface of the vehicle compartment 2. By this means, the passengers in the plurality of sub-mobility devices 50 can view the same display. The main sensor 37 is configured to detect the location, the speed, and the surrounding environment of the automobile 1. The main route generator 38 receives, for example, a destination, and therefore generates a traveling route from the present location to a stop-off point of the automobile 1. The stop-off point may be the same as the destination, or a location near the destination where the automobile 1 can be parked. The main automatic driving unit 39 outputs control signals to the main drive motor 16, the main braking motor 17 and the main steering motor 18, according to, for example, the generated traveling route. By this means, the automobile 1 can automatically move to the destination along the traveling route.

Next, collaboration control by the sub-mobility devices 50 and the automobile 1 will be described. The collaboration control may include, for example, charging control to charge the main buttery 14 of the automobile 1 and the sub-batteries 63 of the sub-mobility devices 50; generation of a traveling route along which the automobile 1 carrying the sub-mobility devices 50 moves to stop-off points; and automatic driving control to automatically drive the automobile 1 along the generated traveling route.

Figure 5:
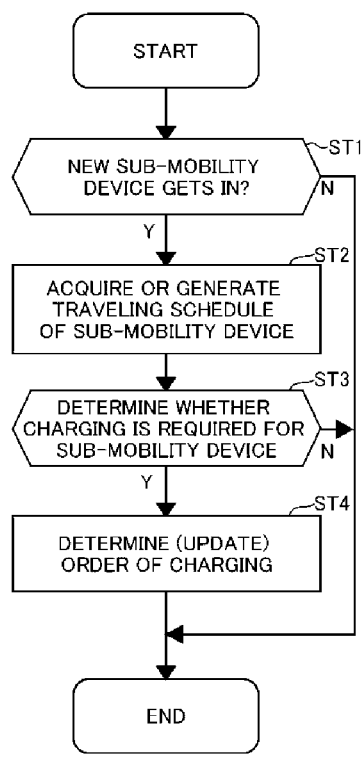
FIG. 5 is a flowchart illustrating a process of determining an order of charging according to Example 1.

During the charging control, the charging of the main battery 14 of the automobile 1 and the sub-batteries 63 of the sub-mobility devices 50 is controlled based on amounts of electric power remaining in the main battery 14 and the sub-batteries 63. FIG. 5 is a flowchart illustrating a process of determining an order of charging according to Example 1. As illustrated in FIG. 5, when a new sub-mobility device 50 gets in the automobile 1, the main electric power controller 32 starts the process of determining an order of charging (step ST1). In this process, the main electric power controller 32 first acquires a traveling schedule for the new sub-mobility device 50 (step ST2). The main electric power controller 32 causes the main communication unit 35 to communicate with the sub-communication unit 75 of the sub-mobility device 50 to acquire information on the destination or information on the traveling schedule in the destination inputted to the sub-input unit 74 of the sub-mobility device 50. After acquiring the information on the destination, the main electric power controller 32 generates a general traveling schedule based on the information on the destination (including, for example, the floor area, the traveling route, and the time required to reach the destination).

The information on the general traveling schedule may be stored in, for example, a recording medium readable by the CPU 40. Next, the main electric power controller 32 determines whether charging is required for the new sub-mobility device 50 (step ST3). The main electric power controller 32 acquires the amount of electric power remaining in the sub-battery 63 from the sub-mobility device 50, and compares the remaining amount of electric power to a necessary amount of electric power to move for an expected running distance. Then, when the remaining amount of electric power is insufficient, the main electric power controller 32 determines that charging is required. On the other hand, when the remaining amount of electric power is not insufficient, the main electric power controller 32 determines that charging is not required. When charging is not required, the main electric power controller 32 ends the process illustrated in FIG. 5. Here, the main electric power controller 32 may determine that charging is required when the remaining amount of electric power acquired from the sub-mobility device 50 is lower than a predetermined threshold value, or lower than an amount of electric power obtained by multiplying the necessary amount of electric power by a predetermined coefficient, instead of when the remaining amount of electric power acquired from the sub-mobility device 50 is lower than the necessary amount of electric power. When the new sub-mobility device 50 is required to be charged, the main electric power controller 32 determines or updates the order of charging the automobile 1 and all the sub-mobility devices 50 carried in the automobile 1 (step ST4). In this case, the main electric power controller 32 may determine the order of charging so as to charge the batteries, for example, in ascending order of the remaining amount of electric power. In addition, when the automobile 1 is required to be charged, the main electric power controller 32 gives the top priority to the automobile 1.

Then, the main electric power controller 32 charges all the sub-mobility devices 50 carried in the automobile 1 according to the process illustrated in FIG. 5. The charging includes internal charging to charge the sub-mobility devices 50 from the automobile 1, and external charging to charge the sub-mobility devices 50 by supplying the sub-mobility devices 50 with electric power from the outside of the automobile 1.

With the internal charging control, the main battery 14 of the automobile 1 supplies electric power to the sub-batteries 63 of the sub-mobility devices 50. For example, when the sub-mobility device 50 gets in the automobile 1, and the sub-electric power receiving connector 61 is coupled to the main electric power supply connector 20, the main electric power controller 32 starts the internal charging control. During the internal charging control, the main electric power controller 32 checks if the sub-electric power receiving connector 61 of the sub-mobility device 50 is coupled to the main electric power supply connector 20. In addition, the main electric power controller 32 checks the amount of electric power remaining in the main battery 14. The remaining amount of electric power may be checked based on, for example, the detected voltage. Then, when the detected voltage of the main battery 14 is equal to or higher than a voltage a little higher than a predetermined minimum voltage, the main electric power controller 32 determines that the internal charging is available, and supplies part of the electric power in the main battery 14 to the sub-battery 63 of the first sub-mobility device 50 in the order of charging. The main electric power controller 32 controls the main converter 15, and starts supplying electric power from the main electric power supply connector 20. By this means, the sub-mobility device 50 is supplied with the electric power, and the sub-battery 63 is charged. Then, the main electric power controller 32 acquires the charging voltage of the sub-battery 63 of the sub-mobility device 50 via the main communication unit 35, and monitors the charging voltage. When the sub-battery 63 is charged to a predetermined necessary voltage, the main electric power controller 32 stops supplying the electric power from the main electric power supply connector 20. By this means, it is possible to charge the sub-battery 63 of the sub-mobility device 50 to the predetermined necessary voltage. In addition, when the charging of one sub-mobility device 50 is completed, the main electric power controller 32 starts charging the sub-mobility device 50 to be charged next in the order of charging. Moreover, during the internal charging, the main electric power controller 32 acquires the charging voltage of the main battery 14 from the main electric power monitor 31, and monitors the charging voltage. When the charging voltage of the main battery 14 is equal to or lower than a predetermined voltage a little higher than the minimum voltage, the main electric power controller 32 stops supplying the electric power from the main electric power supply connector 20. By this internal charging control, it is possible to charge the sub-battery 63 of the sub-mobility device 50 in the automobile 1 to the extent that the amount of electric power remaining in the main battery 14 is not equal to or lower than the minimum value. Therefore, it is possible to avoid the situation where the amount of electric power stored in the automobile 1 becomes insufficient because the electric power is supplied from the automobile 1 to the sub-mobility device 50, and consequently the automobile 1 cannot move to the destination of the automobile 1.

During the external charging control, electric power is supplied from the outside of the automobile 1 to at least the main battery 14 or the sub-batteries 63 via the main electric power receiving connector 11 or the main electric power receiving coil 12, to charge at least one of the main battery 14 and the sub-batteries 63. For example, when the automobile 1 runs on the electric power transmission coil 101 provided on a charging lane of the road, the main electric power controller 32 starts the external charging control. During the external charging control, when the external charging is available, the main electric power controller 32 starts charging the first battery to be charged in the order of charging. By this means, it is possible to charge the main battery 14 and the sub-batteries 63 according to the order of charging by supplying the main buttery 14 and the sub-batteries 63 with the electric power from the outside of the automobile 1. To charge the main battery 14, the main electric power controller 32 controls the main charger 13 to supply the main battery 14 with the electric power inputted to the main electric power receiving coil 12. To charge the sub-battery 63 of any of the sub-mobility devices 50, the main electric power controller 32 controls the main charger 13 and the main converter 15 to supply the main electric power supply connector 20 with the electric power inputted to the main electric power receiving coil 12. In this case, the electric power from the outside of the automobile 1 may be supplied to the sub-batteries 63 via the main battery 14, or may be supplied directly to the main converter 15 from the main charger 13, and supplied to the sub-batteries 63.

Figure 6:
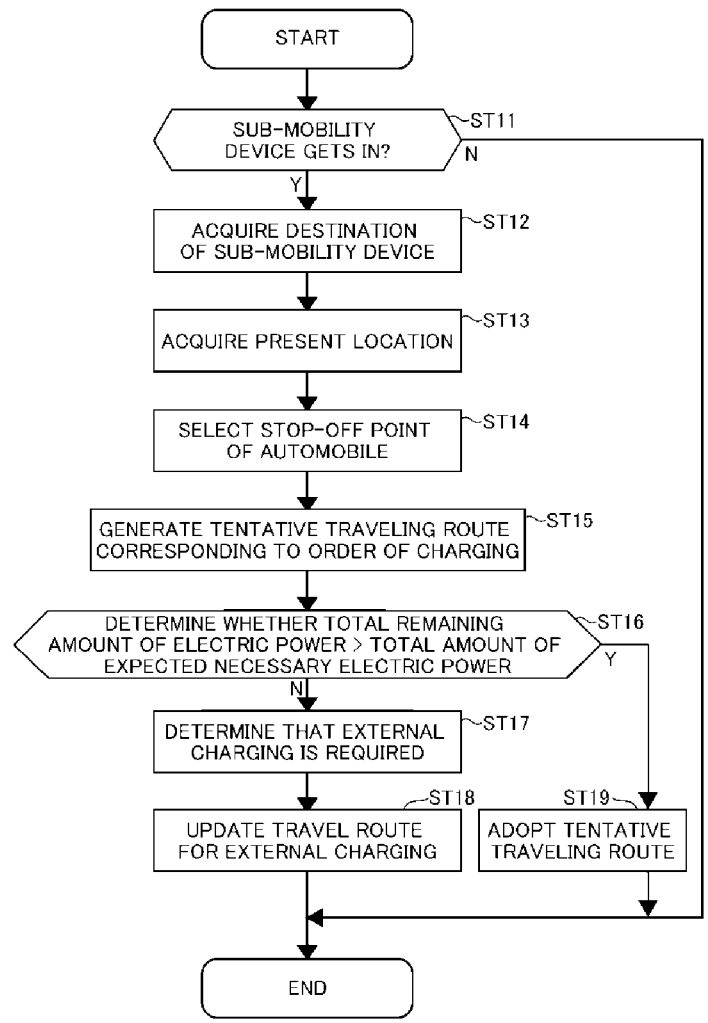
FIG. 6 is a flowchart illustrating a route generation process according to Example 1.

FIG. 6 is a flowchart illustrating a route generation process according to Example 1. With Example 1, a traveling route for the automobile 1 which is suitable for the sub-mobility devices 50 to move to destinations is generated.

As illustrated in FIG. 6, for example, when the sub-mobility devices 50 get in the automobile 1, the main route generator 38 starts a traveling route generation or update process (step ST11).

To generate the traveling route, the main route generator 38 acquires information on the destinations of the one or more sub-mobility devices 50 in the automobile 1, by using the main communication unit 35 (step ST12). The main communication unit 35 communicates with the sub-communication unit 75 of each of the sub-mobility devices 50 in the automobile 1, and acquires information on the destinations used by the sub-route generator 78 to generate the traveling route for the sub-mobility devices 50. In addition, the main route generator 38 acquires the present location from the main GPS receiver 33 (step ST13).

Next, the main route generator 38 selects a stop-off point corresponding to each of the destinations of the one or more sub-mobility devices 50, by using point information (step ST14). The point information may be information on a point prestored in a memory readable by the CPU 40, or information on a point acquired by the main communication unit 35. The main route generator 38 may select, for example, a point where charging is available, as the stop-off point. In addition, when there is parking space in the destination, the main route generator 38 may select the destination as the stop-off point. Then, the main route generator 38 generates a traveling route to pass through one or more stop-off points according to the order of charging, from the present location where the sub-mobility devices 50 get in the automobile 1 (step ST15). The main route generator 38 generates a tentative traveling route to pass through the one or more stop-off points, for example, in the order of charging from the present location. Here, when the order of charging is not generated for the sub-mobility device 50, or when there is the sub-mobility device 50 which is not assigned the order of charging, the main route generator 38 generates a tentative traveling route to preferentially pass through the stop-off point of that sub-mobility device 50.

Next, the main route generator 38 determines whether the external charging is required. To be more specific, the main route generator 38 calculates an expected running distance (expected running load) of the automobile 1, and an expected running distance (expected running load) of each of the sub-mobility devices 50 for the traveling route tentatively generated based on the information on the destinations, and sums these expected running distances (expected running loads) to acquire a total amount of expected necessary electric power. The expected running distance of each of the sub-mobility devices 50 may include information on the expected running distance calculated based on the information on the destination. In addition, the main route generator 38 acquires the amount of electric power remaining in the automobile 1 and the amount of electric power remaining in all the sub-mobility devices 50, and sums these amounts to acquire a total remaining amount of electric power. Next, the main route generator 38 compares the total amount of expected necessary electric power to the total remaining amount of electric power (step ST16). Then, when the total remaining amount of electric power is higher than the total amount of expected necessary electric power, the main route generator 38 determines that the external charging is not required. On the other hand, when the total remaining amount of electric power is lower than the total amount of expected necessary electric power, the main route generator 38 determines that the external charging is required (step ST17).

When the external charging is required, the main route generator 38 calculates the total amount of insufficient electric power in the main battery 14 and the sub-batteries 63, selects one or more running lanes 100 corresponding to the calculated amount of insufficient electric power, as designated routes, and changes part of the tentative traveling route to pass through the selected running lanes 100 (step ST18). By this means, when the total remaining amount of electric power is insufficient for the total expected running distance, it is possible to generate a traveling route to pass through a road or a point where the external charging is available as an actual traveling route. Here, the main route generator 38 may select a location where charging is available instead of the running lane 100, and change the tentative traveling route in the same way as described above.

When the external charging is not required, the main route generator 38 selects the tentative traveling route as an actual traveling route (step ST19).

During the automatic driving control, the automobile 1 is controlled to automatically drive along the traveling route generated by the main route generator 38. The main automatic driving unit 39 first acquires the traveling route from the main route generator 38. Then, the main automatic driving unit 39 controls the main drive motor 16, the main steering motor 18, and the main braking motor 17, periodically checking the present location acquired from the main GPS receiver 33, and checking the location, the speed and the surrounding environment of the automobile 1 detected by the main sensor 37. By this means, the automobile 1 is automatically driven to pass through one or more stop-off points from the present location along the traveling route generated by the main route generator 38. In addition, the main automatic driving unit 39 causes the main electric power controller 32 to perform the external charging control, when the automobile 1 runs on the running lane 100 where charging is available, or when the automobile 1 stops at a stop-off point.

With the present example, as described above, the automobile 1 runs along the traveling route corresponding to the destinations of the sub-mobility devices 50 carried in the automobile 1, and moves to each of the stop-off points. In addition, it is possible to charge the sub-mobility devices 50 in the automobile 1 if necessary. With the present example, the sub-mobility devices 50 are charged based on the acquired traveling schedules for the sub-mobility devices 50 in the destinations, and the main route generator 38 generates the traveling route to guide the charged sub-mobility devices 50 to the stop-off points corresponding to the destinations. Therefore, even though the sub-mobility device 50 is not sufficiently charged before getting in the automobile 1, it is possible to charge the sub-mobility device 50 in the automobile 1, and after getting out of the automobile 1 at the stop-off point corresponding to the destination, the sub-mobility device 50 can move around in the destination.

With the present example, the controller calculates the necessary amount of electric power to move the sub-mobility device 50 based on the destination or the traveling schedule acquired from the sub-mobility device 50. When the remaining amount of electric power acquired from the sub-mobility device 50 is lower than the necessary amount of electric power, the controller generates the traveling route to guide the sub-mobility device 50 to the stop-off point after charging the sub-mobility device 50. On the other hand, when the remaining amount of electric power acquired from the sub-mobility 50 is equal to or higher than the necessary amount of electric power, the controller generates the traveling route to guide the sub-mobility device 50 to the stop-off point without charging the sub-mobility device 50. Therefore, in any case, the sub-mobility device 50 can move around in the destination after getting out of the automobile 1.

With the present example, the controller determines the order of charging based on the total amount of electric power remaining in the automobile 1 and all the sub-mobility devices 50, and generates the traveling route to guide the sub-mobility devices 50 to the stop-off points after charging the sub-mobility devices in the determined order of charging. Therefore, for example, even though all the plurality of sub-mobility devices 50 carried in the automobile 1 are required to be charged, or when the automobile 1 and the sub-mobility devices 50 are required to be charged, it is possible to guide the plurality of sub-mobility devices 50 to their stop-off points after charging the automobile 1 and the plurality of sub-mobility devices 50 in the order of charging.

With the present example, when the new sub-mobility device 50 gets in the automobile 1, the controller updates the order of charging. Therefore, it is possible to guide the sub-mobility devices 50 to the stop-off points after charging the automobile 1 and the sub-mobility devices 50 in the order reflecting the most recent state in the automobile 1.

While the above-described examples are preferred examples of the present invention, it is to be understood that the invention is not limited to these examples. The present invention is intended to cover various modification and alteration without departing from the spirit and scope of the present invention.

The invention claimed is:

1. A sub-mobility device charging system for a vehicle capable of moving while carrying a sub-mobility device in which a passenger sits, the system comprising:
   an acquisition unit configured to acquire a destination or a traveling schedule inputted to the sub-mobility device;
   a main electric power supply unit configured to supply electric power to the sub-mobility device carried in the vehicle; and
   a controller configured to control to supply the electric power to the sub-mobility device via the main electric power supply unit,
   wherein the controller charges the sub-mobility de vice on a basis of the acquired traveling schedule for the sub-mobility device in the destination, and generates a traveling route to guide the charged sub-mobility device to a stop-off point corresponding to the destination.

2. The system according to claim 1, wherein the controller calculates an expected running distance of the vehicle and an expected running distance of the sub-mobility device on a basis of information on the destination, and sums the expected running distances to acquire a total amount of an expected electric power.

3. The system according to claim 1, wherein the controller calculates an amount of electric power to move the sub-mobility device on a basis of a destination or a traveling schedule acquired from the sub-mobility device,
   wherein, when a remaining amount of electric power acquired from the sub-mobility device is lower than the amount of electric power to move the sub-mobility device, lower than a threshold value, or lower than an amount of electric power obtained by multiplying the amount of electric power to move the sub-mobility device by a coefficient, the controller generates the traveling route to guide the sub-mobility device to the stop-off point after charging the sub-mobility device, and
   wherein, when the remaining amount of electric power acquired from the sub-mobility device is equal to or higher than the amount of electric power to move the sub-mobility device, the controller generates the traveling route to guide the sub-mobility device to the stop-off point without charging the sub-mobility device.

4. The system according to claim 2, wherein the controller calculates an amount of electric power to move the sub-mobility device, on a basis of a destination or a traveling schedule acquired from the sub-mobility device,
   wherein, when a remaining amount of electric power acquired from the sub-mobility device is lower than the amount of electric power to move the sub-mobility device, lower than a threshold value, or lower than an amount of electric power obtained by multiplying the amount of electric power to move sub-mobility device by a coefficient, the controller generates the traveling route to guide the sub-mobility device to the stop-off point after charging the sub-mobility device; and
   wherein, when the remaining amount of electric power acquired from the sub-mobility device is equal to or higher than the amount of electric power to move the sub-mobility device, the controller generates the traveling route to guide the sub-mobility device to the stop-off point without charging the sub-mobility device.

5. The system according to claim 1, wherein the controller determines an order of charging on a basis of a total amount of electric power remaining in the vehicle and the sub-mobility device, and generates the traveling route to guide the sub-mobility device to the stop-off point after charging the sub-mobility device in the determined order of charging.

6. The system according to claim 2, wherein the controller determines an order of charging on a basis of a total amount of electric power remaining in the vehicle and the sub-mobility device, and generates the traveling route to guide the sub-mobility device to the stop-off point after charging the sub-mobility device in the determined order of charging.

7. The system according to claim 3, wherein the controller determines an order of charging on a basis of a total amount of electric power remaining in the vehicle and the sub-mobility device, and generates the traveling route to guide the sub-mobility device to the stop-off point charging the sub-mobility device in the determined order of charging.

8. The system according to claim 4, wherein the controller determines an order of charging on a basis of a total amount of electric power remaining the vehicle and the sub-mobility device, and generates the traveling route to guide the sub-mobility device to the stop-off point after charging the sub-mobility device in the determined order of charging.

9. The system according to claim 5, wherein the controller updates the order of charging when a new sub-mobility device is carried in the vehicle.

10. The system according to claim 6, wherein the controller updates the order of charging when a new sub-mobility device is carried in the vehicle.

11. The system according to claim 7, wherein the controller updates the order of charging when a new sub-mobility device is carried in the vehicle.

12. The system according claim 8, wherein the controller updates the order of charging when a new sub-mobility device is carried in the vehicle.

13. A sub-mobility device charging system for a vehicle, the system comprising:
a processor coupled to a memory storing instructions, the processor being configured to:
acquire a destination or a traveling schedule inputted to a sub-mobility device, the vehicle being configured to move while carrying the sub-mobility device in which a passenger sits;
supply electric power to sub-mobility device carried in the vehicle via a main electric power supplier;
control to supply the electric power to the sub-mobility device via the main electric power supplier; and
charge the sub-mobility device on a basis of the acquired traveling schedule for the sub-mobility device in the destination, and generate a traveling route to guide the charged sub-mobility device to a stop-off point corresponding to the destination.

14. The system according to claim 13, wherein the processor is further configured to calculate an expected running distance of the vehicle and an expected running distance of the sub-mobility device on a basis of information on the destination, and to add the expected running distances to acquire a total amount of an expected electric power.

15. The system according to claim 13, wherein the processor is further configured to calculate an amount of electric power to move the sub-mobility device on a basis of a destination or a traveling schedule acquired from the sub-mobility device.

16. The system according to claim 15, wherein, when a remaining amount of electric power acquired from the sub-mobility device is lower than the amount of electric power to move the sub-mobility device, lower than a threshold value, or lower than an amount of electric power obtained by multiplying the amount of electric power to move the sub-mobility device by a coefficient, the processor is further configured to generate the traveling route to guide the sub-mobility device to the stop-off point after charging the sub-mobility device.

17. The system according to claim 16, wherein, when the remaining amount of electric power acquired from the sub-mobility device is equal to or higher than the amount of electric power to move the sub-mobility device, the processor is further configured to generate the traveling route to guide the sub-mobility device to the stop-off point without charging the sub-mobility device.

18. The system according to claim 13, wherein the processor is further configured to determine an order of charging on a basis of a total amount of electric power remaining in the vehicle and the sub-mobility device.

19. The system according to claim 18, wherein the processor is further configured to generate the traveling route to guide the sub-mobility device to the stop-off point after charging the sub-mobility device in the determined order of charging.

20. The system according to claim 19, wherein the processor is further configured to update the order of charging when a new sub-mobility device is carried in the vehicle.

* * * * *